United States Patent [19]

Nakai et al.

[11] 4,417,794
[45] Nov. 29, 1983

[54] AUTOMATIC DIAPHRAGM CONTROL CAMERA

[75] Inventors: Masaaki Nakai, Nara; Masayoshi Sahara, Sennan, both of Japan

[73] Assignee: Minolta Camera Kabushiki Kaisha, Osaka, Japan

[21] Appl. No.: 395,992

[22] Filed: Jul. 7, 1982

[30] Foreign Application Priority Data

Jul. 16, 1981 [JP] Japan ............................ 56-110071

[51] Int. Cl.³ ......................... G03B 7/09; G03B 7/16
[52] U.S. Cl. ..................................... 354/38; 354/41; 354/43; 354/149
[58] Field of Search ..................... 354/41, 42, 43, 38, 354/37, 139, 149

[56] References Cited

U.S. PATENT DOCUMENTS

| 3,777,637 | 12/1973 | Kuramoto et al. | 95/10 CD |
| 3,922,693 | 11/1975 | Matsui | 354/42 |
| 4,142,787 | 3/1979 | Ueda et al. | 354/38 |
| 4,264,159 | 4/1981 | Ueda et al. | 354/24 |
| 4,339,186 | 7/1982 | Yamazaki | 354/38 |

Primary Examiner—Michael L. Gellner
Attorney, Agent, or Firm—Watson, Cole, Grindle & Watson

[57] ABSTRACT

An automatic diaphragm control camera of the T. T. L light measurement type sets a diaphragm to a fully opened aperture in the case of daylight photographing with a low brightness condition by generating a diaphragm stopping-down prevention signal which serves to deactivate an electromagnetic diaphragm stopping-down release device. Upon receipt of a flash readiness signal from an electronic flash device, however, the camera, in preference to the generation of the diaphragm stopping-down prevention signal, activates the electromagnetic diaphragm stopping-down release device in response to a camera release operation.

7 Claims, 1 Drawing Figure

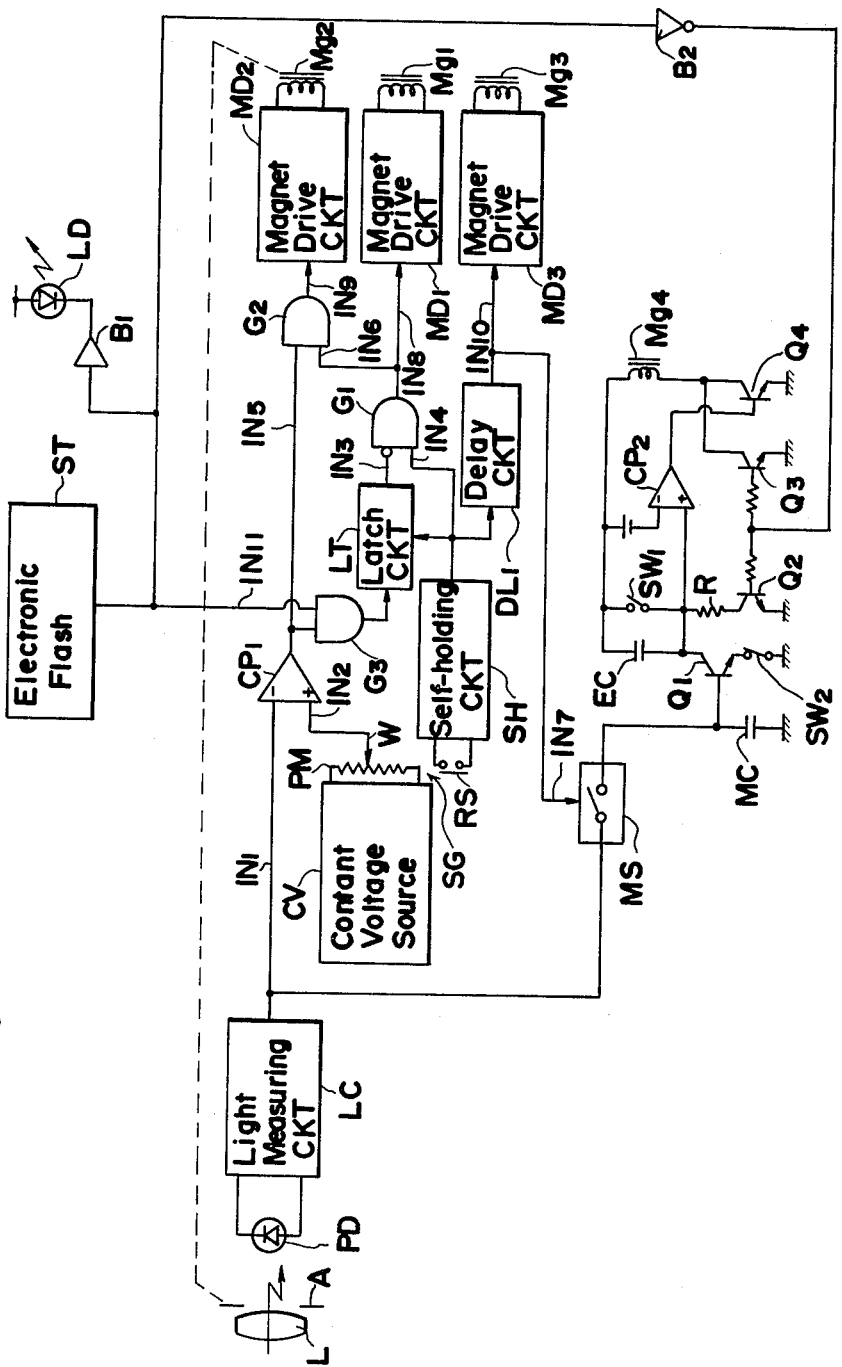
Figure

AUTOMATIC DIAPHRAGM CONTROL CAMERA

BACKGROUND OF THE INVENTION

1. Field of the Invention

The present invention relates to an automatic diaphragm control camera of the T.T.L. (through the lens) light measurement type in which scene light is measured through an objective and a diaphragm aperture being stopped-down, and in which the stopping down operation is stopped by means of an electromagnetic means when the diaphragm reaches an aperture size proper for the intensity of the scene light and set exposure parameters such as a set film sensitivity and a set shutter speed.

2. Description of Prior Art

In cameras of the aforementioned type, it is desired that the diaphragm aperture is left fully opened in the case of daylight photographing with a low brightness condition where an optimum exposure is obtained with the diaphragm set to the fully opened aperture. However, it has been difficult for prior art cameras of the aforementioned type to provide such a fully opened aperture in such cases. This is assumed to be due to the fact that a slight time lag is unavoidable from generation of a diaphragm stop control signal until actual arresting of the diaphragm by a diaphragm arresting electromagnetic means responsive to the diaphragm stop control signal, such that the diaphragm is stopped-down more than is necessary during the aforementioned time lag. Additionally, the mechanical play among, and/or between, the various mechanical linkages from the diaphragm arresting electromagnetic means to a diaphragm stop or arresting member varies with individual cameras. Also, the magnetic force required for pressing the armature of the electromagnetic means to its pole, for example, varies from one to another of individual electromagnetic means incorporated in cameras.

In U.S. Pat. No. 4,339,186 filed on May 1, 1981 and assigned to the same Assignee, there has been proposed automatic diaphgram control cameras of the aforementioned type which eliminate the drawback of prior art cameras. More particularly, the cameras proposed therein are provided with a discrimination means which generates a diaphragm stopping-down prevention signal when it determines that the diaphragm is to be set to a fully opened aperture. A diaphragm release control means deactivates a diaphragm stopping-down release electromagnetic means upon receipt of the diaphragm stopping-down prevention signal. Thus, upon generation of the diaphragm stopping-down prevention signal, no actual diaphragm stopping-down operation occurs and the diaphragm is exactly set to the fully opened aperture. However, a problem occurs with the proposed cameras in the case of flash photography for which the diaphragm is to be stopped-down to a smaller aperture in dependence upon the guide number of a flash device and/or a camera-to-object distance, because the scene is generally dark and the diaphragm is automatically set to a fully opened aperture when flash illumination is necessitated.

SUMMARY OF THE INVENTION

It is accordingly an object of the present invention to provide an improved automatic diaphragm control camera of the aforementioned type which allows stopping-down of the diaphragm in the case of flash photography.

Another object of the present invention is to provide an improved automatic diaphragm control camera of the aforementioned type which, in addition to the above feature, is characterized by automatic change-over of a shutter speed for synchronization with flashing of a flash device.

To achieve these objects, an automatic diaphragm control camera of the present invention is provided with a second diaphragm release control means which upon receipt of a flash readiness signal from a flash device overrides a first diaphragm release control means. This first diaphragm release control means is provided, as in the aforementioned co-pending application, to deactivate a diaphragm stopping-down release electromagnetic means in response to a diaphragm stopping-down prevention signal from a discrimination means, which determines whether the diaphragm is to be set to a fully opened aperture or not, based on T.T.L light measurement and set exposure parameters such as a set film speed and a set shutter speed. It is therefore possible according to the camera of the present invention to stop-down the diaphragm in the case of flash photography as well as to exactly set the diaphragm to the fully opened aperture in the case of daylight photography with a low brightness condition.

Additionally, the camera of the present invention is provided with a first shutter control means for controlling closing of a shutter in dependence upon the intensity of the scene light measured through an objective and the diaphragm aperture, the set film sensitivity and a second shutter control means for controlling the closing of the shutter in response to disappearance of the flash readiness signal due to flashing of the flash device. This second shutter control means causes the shutter to be automatically controlled at a shutter speed completely synchronous with the flashing of the flash device while the first shutter control means is for the automatic shutter speed control in the case of daylight photography.

The above and other objects and features of the present invention will become more apparent from the following description of a preferred embodiment of the present invention taken in conjunction with the accompanying drawing.

BRIEF DESCRIPTION OF THE DRAWING

The single FIGURE is a circuit diagram of an automatic diaphragm control camera according to an embodiment of the present invention.

DESCRIPTION OF THE PREFERRED EMBODIMENT

Referring to the FIGURE, a light measuring circuit LC is provided with a light receiving element PD which receives scene light having passed through an objective L and a diaphragm A of an exchangeable lens mounted on a camera body of a single lens reflex camera. Incorporated in light measuring circuit LC are a circuit for generating a voltage signal corresponding to the intensity of the light received by light receiving element PD, a circuit for generating a voltage signal corresponding to a set film sensitivity and a circuit for combining the voltage signals to generate a voltage signal corresponding to a shutter speed which is determined by the three exposure parameters, i.e., the scene brightness, the aperture size of diaphragm A and the set film sensitivity. The voltage signal corresponding to a shutter speed is an output of light measuring circuit LC and proportional to the logarithm of the scene brightness.

A potentiometer PM connected to a constant voltage source CV is arranged such that its slider W is set to a position corresponding to a manually set shutter speed, whereby potentiometer PM and constant voltage source CV constitute a shutter speed signal generating circuit SG which generates at slider W a voltage signal corresponding to the manually set shutter speed.

A voltage comparator $CP_1$ has a negative input terminal $IN_1$ connected to light measuring circuit LC and a positive input terminal $IN_2$ connected to slider W. Comparator $CP_1$ compares the output of light measuring circuit LC with that of shutter speed signal generating circuit SG and generates a logic "0" low level signal when the former is higher than the latter while generating a logic "1" high level signal when the latter is higher than the former. The output terminal of comparator CP1 is connected to an input terminal of AND circuit $G_2$ as well as to an input terminal of AND circuit $G_3$.

A release switch RS is closed when a shutter release button (not shown) is depressed to a second stage beyond a first stage. At the first stage of the depression of the shutter button a power switch (not shown) is closed for connection of an electric power supply so that an indicating circuit (not shown) can indicate a diaphragm aperture size to be automatically set in accordance with the outputs of light measuring circuit LC and shutter speed signal generating circuit SG.

A self-holding or self-maintaining circuit SH generates a logic "1" signal in response to the closing of release switch RS and holds this signal until a shutter (not shown) completes its closing operation. In other words, the self-holding operation is released in response to a signal generated upon completion of a shutter closing operation. The output terminal of self-holding circuit SH is connected to a latching input terminal of a latch circuit LT, an input terminal $IN_4$ of an AND circuit $G_1$, and an input terminal of a delay circuit $DL_1$. Latch circuit LT has another input terminal connected to the output terminal of AND circuit $G_3$ and latches the output of comparator $CP_1$ generated at the time of the closing of release switch RS and fed through AND circuit $G_3$, while self-holding circuit SH is generating a logic "1" signal. The latched output is applied to an inversion input $IN_3$ of AND circuit $G_1$.

Delay circuit DL1, starts delay action in response to inversion of the output of self-holding circuit SH from "0" to "1", which is caused by the closing of release switch RS, and after a certain period of time, for example 30 m sec., generates a logic "1" signal. The period of time of the delay action is long enough to cover the longest period of the time required for diaphragms of various exchangeable lenses to stop down to their minimum apertures from their fully open apertures. The output terminal of delay circuit $DL_1$ is connected to an input terminal of an electromagnet drive circuit $MD_3$ and a control input terminal $IN_7$ of a memorizing switch means MS. Switch means MS is an analog switch constituted by semi-conductive elements and brought into an OFF state upon receipt of a logic "1" signal at control input terminal $IN_7$. A memory or storage capacitor MC is connected to light measuring circuit LC through switch means MS but disconnected from light measuring circuit LC at the time of generation of a logic "1" signal by delay circuit DL1 for enabling memory or storage capacitor MC to store the output of light measuring circuit LC at this time.

A capacitor EC and a comparator $CP_2$ constitute a known time constant circuit. Switches $SW_1$ and $SW_2$ are opened and closed respectively in association with opening operation of the shutter. With switch $SW_1$ opened and switch $SW_2$ closed, respectively, a current which is proportional to the exponent of the voltage stored in memory or storage capacitor MC flows through the collector and the emitter of transistor $Q_1$ to charge capacitor EC. When the voltage potential at the node between capacitor EC and transistor $Q_1$ drops to a predetermined level, comparator $CP_2$ cuts off a transistor $Q_4$ whose collector is connected to a shutter closing electromagnet $MG_4$. The bases of transistors $Q_2$ and $Q_3$ are connected to an electronic flash device ST through inverter $B_2$ while the collector of transistor $Q_2$ is connected to switch $SW_1$ through a resistor R and the collector of transistor $Q_3$ is connected to electromagnet $Mg_4$. Electronic flash device ST is arranged such that its output applied to the bases of transistors $Q_2$ and $Q_3$ through inverter $B_2$ is inverted from a logic "0" state to a logic "1" state at the same time it emits flash light. In other words, electronic flash device ST generates a logic "0" signal as a flash readiness signal when a main capacitor for storing energy for flashing a flash tube has been charged up to a given level so as to be ready for flashing with sufficient amount of light emission. In response to the inversion of the output of electronic flash device ST, transistor $Q_3$ is cut off to de-energize electromagnet $Mg_4$. This electromagnet $Mg_4$ is interlocked with a shutter closing member (not shown) and allows the shutter to close upon de-energization thereof.

An electromagnet $Mg_1$ is provided to release a diaphragm atop-down mechanism while an electromagnet $Mg_2$ releases a stop member for stopping the stopping-down operation of diaphragm A. Furthermore, an electromagnet $Mg_3$ is provided to release a mirror drive mechanism. Although not shown in the FIGURE, the diaphragm stop mechanism, the stop member and the mirror drive mechanism are well known and will be understood by those skilled in the art. Input terminals $IN_8$, $IN_9$ and $IN_{10}$ of electromagnet drive circuits $MD_1$, $MD_2$ and $MD_3$ are connected to the output terminal of AND circuit $G_1$, the output terminal of AND circuit $G_2$ and the output terminal of delay circuit $DL_1$ respectively. These drive circuits $MD_1$, $MD_2$ and $MD_3$ are arranged to provide currents to the coils of corresponding electromagnets $Mg_1$, $Mg_2$ and $Mg_3$, so that the magnetic fluxes produced by the energization or excitation of the coils cancel the magnetic fluxes produced by permanent magnets of electromagnets $Mg_1$, $Mg_2$ and $Mg_3$. This allows an armature piece of the respective electromagnet to retract under action of a spring from a state at which it is attracted to the permanent magnet. By the retraction of the armature piece the respective electromagnet effects releasing operation as required. Electromagnets of this type are well known in the art and therefore the details of electromagnets $Mg_1$, $Mg_2$ and $Mg_3$ are not shown in the FIGURE.

AND circuit $G_3$ has another input terminal $IN_{11}$ connected to electronic flash device ST. Also connected to electronic flash device ST through a buffer $B_1$ is a light emitting diode LD which is located in a camera viewfinder and which emits light with the output of electronic flash device ST being a "0" level for indication of readiness of flash photography within the camera viewfinder. This indication may be modified such that light emitting diode LD blinks with the output of electronic flash device ST at a "0" level, and furthermore one or more of not shown light emitting diodes provided for other indication purposes such as indication of aperture sizes and shutter speeds may be commonly used for this indication.

The following is an explanation of the operation of the circuitry shown in the FIGURE.

At first where electronic flash device ST is not ready for flashing with sufficient amount of light emission as its main capacitor for storing electric energy for flashing of a flash tube has not been charged up to a given level, a logic "1" signal is generated from electronic flash device ST.

On the other hand, it is assumed that the camera is in a condition ready for photographing and film wind-up and shutter cocking have been completed. When the shutter button is depressed to the first stage, diaphragm A is still retained in a fully opened condition and a voltage signal corresponding to a shutter speed proper for the fully opened aperture of diaphragm A is generated from light measuring circuit LC. If the shutter speed corresponding to this voltage signal is 1/2000 sec. and a shutter speed of 1/125 sec. is manually set, the voltage at input terminal IN1 is higher than that at input terminal IN2 by four steps in time values according to the APEX system, so that a logic "0" signal is generated from comparator $CP_1$, whereby AND circuit $G_3$ generates a logic "0" signal which corresponds to the output of comparator $CP_1$.

When the shutter button is depressed to the second stage to close release switch RS, latch circuit LT latches the output "0" and this latched output enables AND circuit $G_1$. Accordingly, the output "1" generated by self-holding circuit SH in response to the closing of release switch RS passes AND circuit $G_1$ and is fed to input terminal IN8 of drive circuit $MD_1$ as well as to input terminal IN6 of AND circuit $G_2$. Drive circuit $MD_1$ thus energizes the coil of electromagnet $Mg_1$, whereby the diaphragm stopping down mechanism is allowed to stop-down diaphragm A. In parallel therewith, delay circuit $DL_1$ starts delay action in response to the output "1" from self-holding circuit SH.

Light receiving element PD continues to receive scene light through diaphragm A which is being stopped-down and light measuring circuit LC generates a voltage signal corresponding to a shutter speed proper for the momentary diaphragm aperture sizes. Thus, as diaphragm A is stopped down, the output voltage of light measuring circuit LC drops. When the output voltage of light measuring circuit LC becomes lower than the voltage at slider W corresponding to manually set shutter speed 1/125 sec., the output of comparator $CP_1$ is inverted from the "0" state to the "1" state. This output "1" is fed to input terminal of drive circuit $MD_2$ through AND circuit $G_2$, so that the coil of electromagnet $Mg_2$ is energized to allow the stop member to stop the stopping-down operation of diaphragm A. In this manner, diaphragm A is automatically set or determined to an aperture size which provides an optimum exposure in association with the manually set shutter speed 1/125 sec. and the set film sensitivity.

Delay circuit $DL_1$ generates a logic "1" signal after lapse of the time period of its delay action from the closing of release switch RS. Prior to the generation of this logic "1" signal, the automatic diaphragm determination has been completed and thus memory or storage capacitor MC has been charged up to a voltage level corresponding to a shutter speed proper for the automatically determined aperture size of diaphragm A. After switch means MS is opened by the logic "1" signal from delay circuit $DL_1$, drive circuit $MD_3$ energizes the coil of electromagnet $Mg_3$, so that the mirror drive mechanism drives a mirror (not shown) of the single lens reflex camera to a photographing position from an image observation position. Subsequent to the mirror driving operation, the shutter is opened to initiate an exposure of a film. At this time, switches $SW_1$ and $SW_2$ are opened and closed respectively and capacitor EC begins to be charged by the current flowing through transistor $Q_1$. After a lapse of time corresponding to the voltage at memory or storage capacitor MC, comparator $CP_2$ cuts off transistor $Q_4$, whereby electromagnet $Mg_4$ is de-energized and the shutter closes.

Next, explanation is given of the case where the output of light measuring circuit LC is lower than that of shutter speed signal generating circuit SG with diaphragm A being fully opened. If the shutter speed corresponding to the output of light measuring circuit LC is 1/60 sec. and the manually set shutter speed is 1/125 sec., a logic "1" signal is generated from comparator $CP_1$ as a diaphragm stopping-down prevention signal. When release switch RS is closed and a logic "1" signal is generated from self-holding circuit SH in response thereto, latch circuit LT latches the output "1" of comparator $CP_1$ having passed through AND circuit $G_3$ as well as generates this output "1", and at the same time delay circuit $DL_1$ starts the delay action. However, as the output "1" from latch circuit LT is fed to inversion input terminal IN3 of AND circuit $G_1$, this AND circuit is disabled to prevent passage of the output "1" from self-holding circuit SH. Accordingly, no current is supplied by drive circuit $MD_1$ to the coil of electromagnet $Mg_1$, whereby electromagnet $Mg_1$ continues to retain the diaphragm stop-down mechanism so that diaphragm A is kept fully opened. In other words, no stopping-down operation of diaphragm A occurs. In this case, AND circuit $G_2$ is also disabled to cause drive circuit $MD_2$ to supply no current to the coil of electromagnet $Mg_2$. This is satisfactory because it is unnecessary in this case to release the stop member for stopping the stopping-down operation of diaphragm A. Independently of diaphragm A being kept fully opened, delay circuit $DL_1$ generates a logic "1" signal after the delay action and drive circuit $MD_3$ supplies a current to the coil of electromagnet $Mg_3$, so that the mirror drive mechanism drives the mirror as described above and the shutter opens. The logic "1" signal from delay circuit $DL_1$ also causes switch means MS to open, whereby the voltage signal from light measuring circuit LC, which corresponds to a shutter speed proper for the fully open aperture size of diaphragm A, is stored in memory or storage capacitor MC. Accordingly, the shutter is automatically controlled at this shutter speed by the circuit constituted by transistors $Q_1$, $Q_4$ capacitor EC, switches $SW_1$ and $SW_2$ and comparator $CP_2$.

The following explanation is for the case where electronic flash device ST is ready for flashing with sufficient amount of light emission for flash photographing, i.e., the main capacitor thereof has been charged up to the given level.

In this case, electronic flash device ST generates a logic "0" signal and light emitting diode LD emits light for indication of readiness of flash photography. Receiving the logic "0" signal at input terminal IN7, AND circuit G3 is disabled to feed a logic "0" signal to latch circuit LT independently of the state of the output of comparator CP1. Latch circuit LT latches and generates that signal "0", which in turn enables AND circuit G1. As a result, a logic "1" signal generated by self-holding circuit SH in response to closing of release switch RS passes AND circuit G1 to be applied to input terminal IN8 of drive circuit MD1 and input terminal IN6 of AND circuit G2, whereby AND circuit G2 is enabled and drive circuit MD1 energizes the coil of electromagnet Mg1 for allowing the stopping-down operation of diaphragm A. Thus, diaphragm A can be stopped-down in response to the closing of release switch RS. At this time, transistors Q2 and Q3 are made conductive because inverter B2 receiving the logic "0" signal from electronic flash device ST applies a logic "1" signal to the bases of these transistors. When drive circuit MD3 energizes the coil of electromagnet Mg3 so that the mirror drive mechanism drives the mirror and thereafter the shutter opens, switches SW1 and SW2 are opened and closed, respectively, and thus capacitor EC begins to be charged, not only by a current flowing through transistor Q1 and corresponding to the voltage signal stored in memory or storage capacitor MC, but also by a current flowing through resistor R and transistor Q2. The result is therefore that comparator CP2 cuts off transistor Q4 immediately after the opening of the shutter while electromagnet Mg4 is kept energized by a current flowing through transistor Q3.

Upon flashing of electronic flash device ST in synchronism with the full opening of the shutter, the output signal of electronic flash device ST is inverted from the "0" state to the "1" state, causing inverter B2 to cut of transistors Q2 and Q3, whereby electromagnet Mg4 is de-energized for closing the shutter. Accordingly, the shutter is controlled at a shutter speed which is completely synchronous with the flashing of electronic flash device ST.

Where flash photography is to be effected, the scene brightness is generally low and therefore diaphragm A is kept fully opened. However, diaphragm A should be stopped-down to a smaller aperture size depending upon the guide number of electronic flash device ST and the camera-to-object distance. For this reason, allowing the stopping-down operation of diaphragm A as described above is necessitated in flash photography. In the embodiment, actual stopping-down of diaphragm A may be achieved by a method of causing electronic flash device ST to emit preliminary flash light of relatively low and substantially constant intensity prior to the emission of the flash light which is synchronous with the full opening of the shutter. Such a method is disclosed in detail in, for example, U.S. Pat. No. 4,305,647. Alternatively, a method of stopping-down the diaphragm by an aperture setting signal from an electronic flash device as disclosed in U.S. Pat. No. 4,319,814 may be employable as well. Furthermore, it is also possible to set the diaphragm aperture in accordance with the scene brightness with a shutter speed set to a longer or slower value.

Additionally, other than the signal indicative of completion of charging of a main capacitor of flash device ST, a signal indicative of mounting of the flash device on a camera body and a signal responsive to power-on of the flash device may be employable as a flash readiness signal to be transmitted from the flash device to the camera body. Additionally, where an electronic flash device is built in a camera body to pop-up therefrom by setting of flash photography, a signal of such popping-up of the flash device may be a flash readiness signal. However, the signal indicative of completion of charging of a main capacitor of the flash device as disclosed in the embodiment is most preferable because it most exactly corresponds to readiness of flashing of the flash device.

As described in detail in conjunction with a preferred embodiment, a camera of the present invention not only assures automatic setting of a diaphragm to a fully opened aperture when the scene is dark so that the diaphragm is to be retained at the fully opened aperture in daylight photography but also allows stopping-down of the diaphragm in flash photography with use of an electronic flash device. Thus, diaphragm settings depending on the type of photography are made possible according to the camera of the present invention.

Meanwhile, in the disclosed embodiment, light measuring circuit LC, shutter speed signal generating circuit SG and comparator CP1 constitute the discriminating means, AND circuit G1 and latch circuit LT constitute the first diaphragm release control means, and AND circuit G3 constitutes the second diaphragm release control means. Additionally, memory or storage capacitor MC, transistors Q1 and Q4, capacitor EC, switches SW1 and SW2 and comparator CP2 constitute the first shutter control means and transistors Q2 and Q3 and resistor R constitute the second shutter control means.

While a preferred embodiment of the present invention has been described, variations thereof will occur to those skilled in the art within the scope of the present inventive concepts which are delineated by the following claims.

What is claimed is:

1. A camera for use with a flash device capable of generating a flash readiness signal, comprising:
    an objective;
    a diaphragm normally retained in a fully opened aperture position;
    discrimination means including means for measuring light through said objective and diaphragm aperture and determining whether said diaphragm is to be set to the fully opened aperture position, based on the light measured through said objective and said diaphragm, a set film sensitivity and a set shutter speed, and generating a diaphragm stopping-down prevention signal when it is determined that said diaphragm is to be set to the fully opened aperture position;
    diaphragm stopping-down release means for allowing stopping-down of said diaphragm in response to a camera release operation;
    first diaphragm release control means for deactivating said diaphragm stopping-down release means in response to said diaphragm stopping-down prevention signal from said discrimination means; and
    second diaphragm release control means for overriding said first diaphragm release control means in response to said flash readiness signal from said flash device.

2. A camera as defined in claim 1, further comprising:
    a shutter;
    first shutter control means for controlling closing of said shutter in dependence upon the intensity of light measured through said objective and said diaphragm and the set film sensitivity; and second shutter control means for controlling closing of said shutter in response to disappearance of said flash readiness signal due to flashing of said flash device such that said shutter is controlled at a shutter speed completely synchronous with the flashing of said flash device.

3. A camera as defined in claim 2, wherein said second shutter control means includes a circuit for overriding said first shutter control means in response to said flash readiness signal due to flashing of said flash device.

4. A camera as defined in claim 1, further comprising flash readiness indication means for indicating the presence of said flash readiness signal from said electronic flash device.

5. A camera as defined in claim 4, wherein said flash readiness indication means includes a light emitting element.

6. A camera as defined in claim 1, wherein said flash device is an electronic flash device which generates said flash readiness signal upon reaching a condition ready for flashing with sufficient amount of light emission.

7. A camera as defined in claim 1, wherein said light measuring means further includes
a light measuring circuit having a light receiving element disposed to measure the intensity of the scene light having passed through said objective and said diaphragm and said discriminating means further includes means for calculating a proper shutter speed from the light measurement by said light receiving element and information of the set film sensitivity to generate a proper shutter speed signal;

set shutter speed signal generating means for generating a manually set shutter speed signal; and a comparator for comparing said proper shutter speed signal with said set shutter speed signal to generate said diaphragm stopping-down prevention signal when the former signal represents a given relationship with respect to the latter signal with said diaphragm retained in the fully opened aperture position.

* * * * *